US009411410B2

(12) United States Patent
Noda et al.

(10) Patent No.: US 9,411,410 B2
(45) Date of Patent: Aug. 9, 2016

(54) INFORMATION PROCESSING DEVICE, METHOD, AND PROGRAM FOR ARRANGING VIRTUAL OBJECTS ON A CURVED PLANE FOR OPERATION IN A 3D SPACE

(75) Inventors: Takuro Noda, Tokyo (JP); Akihiro Komori, Tokyo (JP); Nariaki Satoh, Kanagawa (JP); Osamu Shigeta, Tokyo (JP); Kazuyuki Yamamoto, Kanagawa (JP)

(73) Assignee: Sony Corporation, Tokyo (JP)

( * ) Notice: Subject to any disclaimer, the term of this patent is extended or adjusted under 35 U.S.C. 154(b) by 16 days.

(21) Appl. No.: 13/167,793

(22) Filed: Jun. 24, 2011

(65) Prior Publication Data
US 2012/0047465 A1    Feb. 23, 2012

(30) Foreign Application Priority Data

Aug. 19, 2010    (JP) ................................ P2010-184007

(51) Int. Cl.
*G06F 3/01* (2006.01)
*G06F 3/03* (2006.01)
*G06F 3/0484* (2013.01)

(52) U.S. Cl.
CPC  *G06F 3/011* (2013.01); *G06F 3/03* (2013.01); *G06F 3/04842* (2013.01)

(58) Field of Classification Search
CPC ................ G06F 3/011; G06F 3/04815; G06F 17/30873; G06F 3/03; G06F 3/04842; G09B 19/0038

USPC .................... 715/848, 850; 434/274; 345/419
See application file for complete search history.

(56) References Cited

U.S. PATENT DOCUMENTS

| 6,749,432 | B2 * | 6/2004 | French et al. .................. 434/247 |
| 2003/0077556 | A1 * | 4/2003 | French et al. .................. 434/258 |
| 2006/0187196 | A1 | 8/2006 | Underkoffler et al. |
| 2007/0216894 | A1 | 9/2007 | Garcia et al. |
| 2009/0027337 | A1 * | 1/2009 | Hildreth ......................... 345/158 |
| 2009/0300551 | A1 * | 12/2009 | French et al. .................. 715/848 |
| 2010/0199221 | A1 * | 8/2010 | Yeung et al. .................. 715/850 |
| 2010/0309197 | A1 * | 12/2010 | Porwal .......................... 345/419 |
| 2011/0063287 | A1 * | 3/2011 | McNeill ......................... 345/419 |

FOREIGN PATENT DOCUMENTS

| CN | 101810003 A | 8/2010 |
| JP | 2006-209563 | 8/2006 |
| JP | 2008-089985 | 4/2008 |

(Continued)

OTHER PUBLICATIONS

Jun. 3, 2015, CN communication issued for related CN application No. 201110236550.

*Primary Examiner* — Li Sun
(74) *Attorney, Agent, or Firm* — Paratus Law Group, PLLC

(57) ABSTRACT

There is provided an information processing device including an acquisition section configured to acquire a curved movement of a body of a user as an operation, a display control section configured to display an object in a virtual three-dimensional space, and a process execution section configured to execute a process on the object based on the acquired operation. The object may be arranged on a first curved plane based on a virtual position of the user set in the virtual three-dimensional space, the first curved plane corresponding to the curved movement.

15 Claims, 10 Drawing Sheets

(56) References Cited

FOREIGN PATENT DOCUMENTS

| | | |
|---|---|---|
| JP | 2008-530661 | 8/2008 |
| JP | 2009-528514 | 8/2009 |
| JP | 2010-146481 | 7/2010 |
| WO | WO2009/018161 | 2/2009 |
| WO | WO2009/018161 A1 | 2/2009 |

* cited by examiner

INFORMATION PROCESSING DEVICE, METHOD, AND PROGRAM FOR ARRANGING VIRTUAL OBJECTS ON A CURVED PLANE FOR OPERATION IN A 3D SPACE

BACKGROUND

The present disclosure relates to an information processing device, an information processing method, and a program. In particular, the present disclosure relates to an information processing device, an information processing method, and a program for acquiring an operation instruction based on a movement of the body of a user.

In recent years, technologies for acquiring an operation instruction to an information processing device such as a PC (Personal Computer) based on a movement of the body of a user have been developed. A movement of the body of a user is acquired by, for example, recognizing a body part such as a hand of a user through an image analysis or the like using a marker attached to the user, a controller gripped by the user, or speckle patterns and further identifying the position of the recognized body part using a three-dimensional measurement method such as triangulation or TOF (Time Of Flight).

As an example of such technologies, JP 2009-528514A discloses a technology of using a gesture of a user, which has been identified through an image analysis using speckle patterns, as an input to a computer application. In addition, JP 2008-530661A discloses a technology of mapping a physical space in which a user exists onto a virtual space on a system and reflecting a movement of the user acquired in the physical space into a cursor control.

SUMMARY

However, when a user attempts to move his/her hand in the left-to-right direction while stretching the arm horizontally, the movement path of the hand will be an approximately arcuate line that is based on a shoulder joint as the center, which means that a natural body movement of a user is not necessarily linear. In contrast, in many applications of PCs and the like, movements in straight lines in, for example, the horizontal direction, the vertical direction, or the depth direction are predicted.

Therefore, when a movement of the body of a user is used as an operation instruction to an information processing device as disclosed in JP 2009-528514A and JP 2008-530661A, for example, there is a problem in that the user should consciously adjust the movement of his/her body such that it becomes a movement in a straight line for issuing a desired operation instruction, and thus the user may be forced to make an unnatural body movement in some cases.

In light of the foregoing, it is desirable to provide an information processing device, an information processing method, and a program, which are novel and improved, and with which a user can issue a desired operation instruction to a displayed object through a natural body movement.

According to an embodiment of the present disclosure, there is provided an information processing device including an acquisition section configured to acquire a curved movement of a body of a user as an operation, a display control section configured to display an object in a virtual three-dimensional space, and a process execution section configured to execute a process on the object based on the acquired operation. The object may be arranged on a first curved plane based on a virtual position of the user set in the virtual three-dimensional space, the first curved plane corresponding to the curved movement.

According to such a configuration, the user can recognize objects that are arranged on a curved plane corresponding to a curved movement, which is a natural movement of the user, based on the virtual position of the user in the virtual three-dimensional space. Thus, it becomes easier for the user to grasp the arrangement of the objects in the virtual three-dimensional space and the movement of the body of the user while linking them to each other. Accordingly, the user can be induced to operate the objects through a natural, curved movement of his/her body. In addition, as the objects are arranged on the curved plane corresponding to the curved movement of the user in the virtual three-dimensional space, the objects can be operated in the direction intended by the user based on the curved movement of the user.

The acquisition section may acquire a position of a center part of the body of the user, and the virtual position of the user may be set based on the position of the center part.

The acquisition section may acquire an actual distance to the body of the user, and a virtual distance from the virtual position of the user to the object may be set based on the actual distance.

The acquisition section may acquire a size of the body of the user, and a virtual distance from the virtual position of the user to the object may be set based on the size.

The object may also be arranged on a second curved plane based on the virtual position of the user, the second curved plane corresponding to the curved movement. A virtual distance from the virtual position of the user to the object arranged on the second curved plane may be longer than a virtual distance from the virtual position of the user to the object arranged on the first curved plane.

The object may have a front face and side faces, and the object may be arranged such that the front face towards the virtual position of the user.

The virtual position of the user may be a point in the virtual three-dimensional space.

The curved movement may be an approximately arcuate movement, and the first curved plane may be an approximately spherical plane having the point as a center.

The virtual position of the user may be a straight line in the virtual three-dimensional space.

The curved movement may be an approximately arcuate movement, and the first curved plane may be an approximately cylindrical plane having the straight line as a center.

According to another embodiment of the present disclosure, there is provided an information processing method including acquiring a curved movement of a body of a user as an operation, displaying an object in a virtual three-dimensional space, and executing a process on the object based on the acquired operation. The object may be arranged on a first curved plane based on a virtual position of the user set in the virtual three-dimensional space, the first curved plane corresponding to the curved movement.

According to another embodiment of the present disclosure, there is provided a program for causing a computer to function as an acquisition section configured to acquire a curved movement of a body of a user as an operation, a display control section configured to display an object in a virtual three-dimensional space, and a process execution section configured to execute a process on the object based on the acquired operation. The object may be arranged on a first curved plane based on a virtual position of the user set in the virtual three-dimensional space, the first curved plane corresponding to the curved movement.

According to the embodiments of the present disclosure described above, a user can issue a desired operation instruction to a displayed object through a natural body movement.

DETAILED DESCRIPTION OF THE EMBODIMENTS

Figure 1:
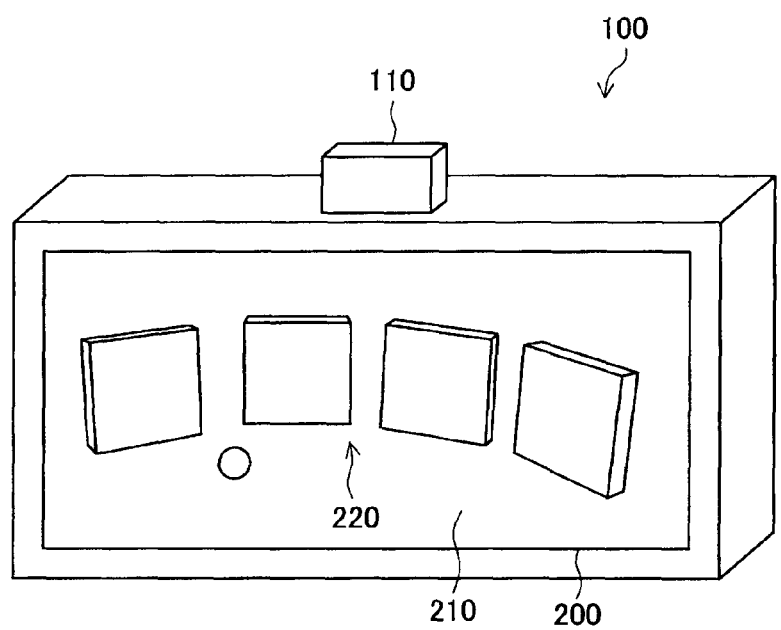
FIG. 1 is a diagram showing a schematic configuration of an information processing device in accordance with the first embodiment of the present disclosure.
Figure 1:
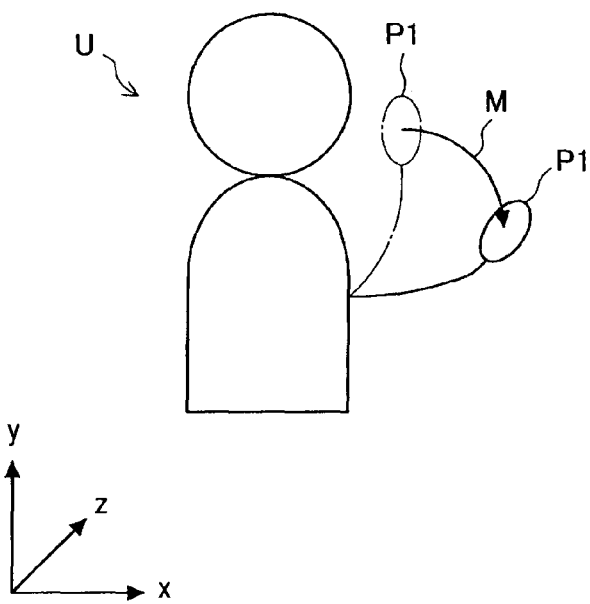

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

The description will be given in the following order.
1. First Embodiment
1-1. Device Configuration
1-2. Display of Objects
2. Second Embodiment
3. Third Embodiment
4. Conclusion
(1. First Embodiment)
(1-1. Device Configuration)

First, a device configuration in accordance with the first embodiment of the present disclosure will be described with reference to FIGS. 1 and 2.

FIG. 1 is a diagram showing a schematic configuration of an information processing device 100 in accordance with the first embodiment of the present disclosure. Referring to FIG. 1, the information processing device 100 causes its display screen 200 to display a virtual three-dimensional space 210 and objects 220 that are arranged in the virtual three-dimensional space 210. When a user U moves a body part P1, an acquisition section 110 of the information processing device 110 acquires the movement M as an operation. The information processing device 100 executes a process on the objects 220 based on the acquired operation.

The information processing device 100 can be a device such as a PC, for example. The information processing device 100 has the acquisition section 110. The acquisition section 110 and the display screen 200 of the information processing device 100 can be provided as an integral unit as shown or provided separately. In addition, the information processing device 100 can be implemented as a function that is provided by a server on a network connected to the acquisition section 110 and the display screen 200. The function and configuration of the information processing device 100 are described below.

The display screen 200 can be, for example, a device that displays an image on a LCD (Liquid Crystal Display), a PDP (Plasma Display Panel), or an organic EL (Electro-Luminescence) panel. The display screen 200 can be integrated with the information processing device 100 as shown or provided separately from the information processing device 100. The display screen 200 displays the virtual three-dimensional space 210 and the objects 220 that are arranged in the virtual three-dimensional space 210. The display screen 200 can be replaced with another display device such as, for example, a head mounted display. The display of the objects 220 is described below.

Herein, when the information processing device 100 and the display screen 200 are integrated, the following case is considered, for example: the information processing device 100 is a tablet PC and the display screen 200 is its display portion. Alternatively, the information processing device 100 can be a television and the display screen 200 can be its screen. Meanwhile, when the information processing device 100 and the display screen 200 are provided separately, the following case is considered, for example: the information processing device 100 is a desktop PC and the display screen 200 is a display connected to the PC. Alternatively, the information processing device 100 can be a function provided by a server and the display screen 200 can be a television that is connected to the server via a network.

The user U operates the objects 220 displayed on the display screen 200 through the movement M of the body part P1. Although a hand is shown as the body part P1 herein, the body part P1 can be another body part of the user U such as a left hand, elbow, shoulder, face, knee, or foot. The movement M of the body of the user U is acquired by the acquisition section 110 of the information processing device 100. At this time, the acquisition section 110 can acquire the movement M of the body of the user U by regarding the horizontal direction, the vertical direction, and the depth direction seen from the user U as the x-axis, the y-axis, and the z-axis, respectively.

A movement of a human body is typically based on an approximately arcuate movement that is based on a joint as the center. Therefore, in many cases, the movement M of the body of the user U is captured as a movement in a curved line. For example, a movement of a hand of the user U can be regarded as an approximately arcuate movement that is based on a shoulder of the user U as the center. In this case, unless the position of the shoulder is moved, a movement path of the hand can be contained in an approximately spherical plane with the shoulder of the user U as the center. Meanwhile, in this case, if the position of the shoulder is moved in the vertical direction through knee bending and stretching exercises or the like, a movement path of the hand can be regarded as forming an approximate cylindrical plane with the trunk of the user U as an axis. As described above, a movement of the user U can be an approximately arcuate movement that is based on the position of a joint of the user U, the trunk of the user U, or the center of the body of the user U, and a path of the movement of the user U can form a plane that is represented as a set of approximate arcs, such as an approximately spherical plane or an approximately cylindrical plane.

Figure 2:
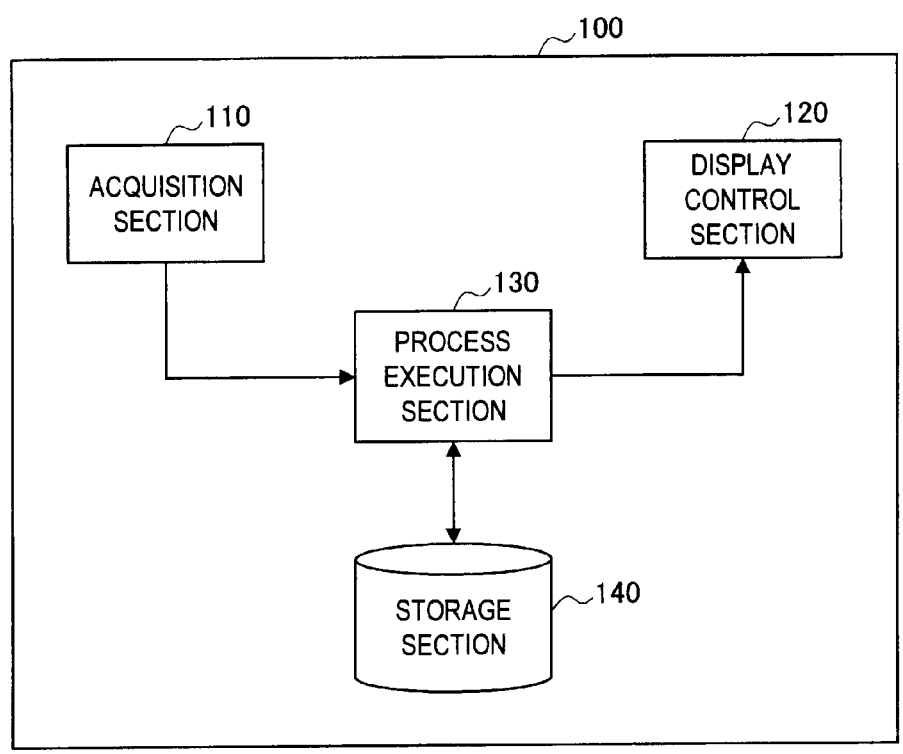
FIG. 2 is a block diagram showing the function and configuration of the information processing device in accordance with the first embodiment.

FIG. 2 is a block diagram showing the function and configuration of the information processing device 100 in accordance with the first embodiment of the present disclosure. Referring to FIG. 2, the information processing device 100 includes the acquisition section 110, a display control section 120, a process execution section 130, and a storage section 140. Note that the storage section 140 need not necessarily be included in the information processing device 100.

The acquisition section 110 acquires a curved movement M of the body of the user U as an operation. For example, the acquisition section 110 recognizes a body part P1 through an image analysis or the like using a marker attached to the body part P1, a controller gripped by the body part P1, or speckle patterns of the body part P1, and further identifies the position of the body part P1 using a three-dimensional measurement method such as triangulation or TOF. Likewise, the acquisition section 110 can acquire the position of the center part P2 of the body of the user U as described below. Further, the acquisition section 110 can acquire the distance from the display screen 200 to the body of the user U. The acquisition section 110 can also acquire the body size of the user U. Furthermore, the acquisition section 110 can, in order to acquire an operation such as selection of the object 220 by the user U, acquire the state of the body part P1 such as, for example, whether the hand is clenched or not. In order to implement the aforementioned functions, the acquisition section 110 can include a camera or infrared emitting and receiving portions, for example. In addition, the acquisition section 110 can also include a processor for analysis and measurement purposes. The functions of the processor can be implemented with a CPU (Central Processing Unit) described below.

The display control section 120 displays the objects 220 in the virtual three-dimensional space 210. The display control section 120 causes the display screen 200 to display the virtual three-dimensional space 210 and the objects 220 that are arranged in the virtual three-dimensional space 210. The display control section 120 can move the objects 220 or change the display of the objects 220 in accordance with a process executed by the process execution section 130. The display control section 120 can be, for example, a GPU (Graphics Processing Unit) that executes an arithmetic process for displaying an image. The function of the display control section 120 can be implemented with a CPU described below. The display of the objects 220 is described below.

The process execution section 130 executes a process on the objects 220 displayed by the display control section 120 based on an operation acquired by the acquisition section 110. A process executed on the objects 220 can be, for example, a process of selecting one or more of the arranged objects 220 based on an operation of the user U, or a process of moving one or more of the selected objects 220 based on an operation of the user U. When a process executed by the process execution section 130 involves a change of the display such as a movement of the objects 220, the process execution section 130 executes the process on the objects 220 via the display control section 120. The function of the process execution section 130 can be implemented by a CPU that executes a program stored in the storage section 140.

The storage section 140 stores data used for the processing in the information processing device 100. The storage section 140 can be a storage device such as, for example, RAM (Random Access Memory) or ROM (Read Only Memory). Alternatively, the storage section 140 can be a removable storage medium such as an optical disc, a magnetic disk, or semiconductor memory, or can be a combination of a storage device and a removable storage medium. The storage section 140 can store a program for implementing the function of each section of the information processing device 100 by being executed by the CPU. Such a program can be either provided by being stored in a removable storage medium or by being downloaded from a network via a communication section (not shown), for example.

Note that the aforementioned components of the information processing device 100 need not necessarily be included in a single chassis. For example, such components can be arranged in different places on a network so that the functions of the information processing device 100 can be provided via the network in a cooperative manner.

(1-2. Display of Objects)

Next, the display of the objects 220 in accordance with the first embodiment of the present disclosure will be described with reference to FIGS. 3 to 6.

Figure 3:
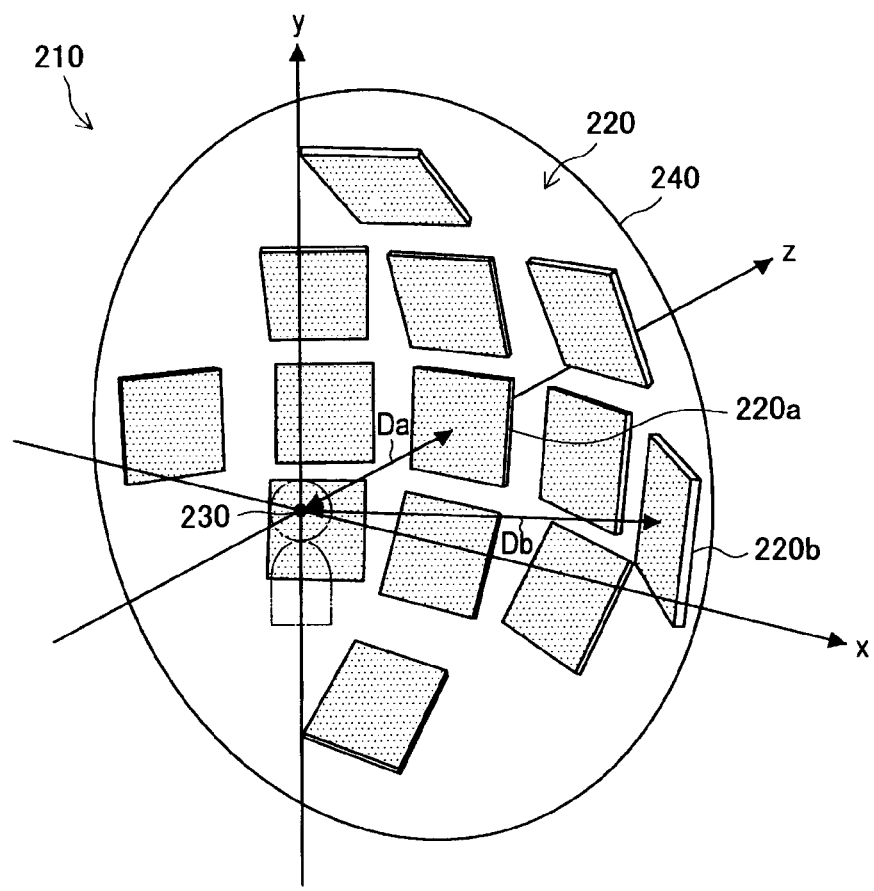
FIG. 3 is a diagram illustrating an arrangement of objects displayed in the first embodiment.

FIG. 3 is a diagram illustrating an arrangement of the objects 220 displayed in the first embodiment of the present disclosure. Referring to FIG. 3, the objects 220 are arranged on a first curved plane 240 that is an approximately spherical plane having a reference point 230, which is set in the virtual three-dimensional space 210, as the center.

The virtual three-dimensional space 210 is a virtual three-dimensional space displayed on the display screen 200 by the display control section 120 of the information processing device 100. The x-axis, the y-axis, and the z-axis are set in the virtual three-dimensional space 210 as shown. The x-axis, the y-axis, and the z-axis can be the horizontal direction, the vertical direction, and the depth direction, respectively, of the display screen 200. Herein, the movement M of the body of the user U can be acquired by the acquisition section 110 based on the horizontal direction, the vertical direction, and the depth direction seen from the user U as the x-axis, the y-axis, and the z-axis, respectively. That is, a coordinate system corresponding to the movement M of the body of the user U can be set in the virtual three-dimensional space 210.

The objects 220 are icons displayed in the virtual three-dimensional space 210 such as, for example, icons representing music content, movie content, or the like, a pointer for selecting the content, and a button representing an operation to be executed on the content. Although the objects 220 herein are shown as approximately plate-like icons representing content, the objects 220 are not limited thereto. For example, the objects 220 can have various shapes such as, for example, hand shaped icons representing pointers. Alternatively, the objects 220 can represent processes to be executed by the process execution section 130 based on an operation acquired by the acquisition section 110 of the information processing device 100. As an example of such processes, the object 220 can be selected based on an operation of the user U, and the selected object 220 can be moved through an operation of the user U.

Herein, the objects 220 are arranged on the first curved plane 240 that is an approximately spherical plane having the reference point 230 as the center. The reference point 230 is a point set as a virtual position of the user U in the virtual three-dimensional space 210. For example, the reference point 230 can be set as the virtual center of the body of the user U. Note that the reference point 230 is not necessarily related to the actual viewpoint of the user U. As described above, the movement M of the body of the user U can be regarded as an approximately arcuate movement that is based on the center of the body of the user U as the center. Thus, the first curved plane 240, which is an approximately spherical plane having the reference point 230 set as the virtual position of the user U as the center, is a curved plane corresponding to the curved movement M of the user U.

The distance from the reference point 230 to each of the plurality of objects 220 arranged on such a first curved plane 240 is approximately equal. For example, a distance Da to an object 220a that is located in front of the reference point 230 in the depth direction is approximately equal to a distance Db to an object 220b that is located to the right of the object 220a. This means that the objects 220 in the horizontal direction of the virtual three-dimensional space 210 are arranged not in straight lines in the horizontal direction but in approximately arcuate lines with the reference point 230 as the center. Likewise, the objects 220 in the vertical direction of the virtual three-dimensional space 210 are arranged not in straight lines in the vertical direction but in approximately arcuate lines with the reference point 230 as the center.

Note that the virtual distance D from the reference point 230 to each object 220 can be a preset value. Alternatively, for example, a function of adjusting the virtual distance D in accordance with the length of an arm of the user U can be provided. As a further alternative, the virtual distance D can be adjusted based on the position, size, or the like of the user U.

With the aforementioned arrangement of the objects 220, the user U recognizes from the display of the display screen 200 that, for example, the objects 220 are arranged corresponding to an approximately arcuate movement, which is a natural movement, of a hand that is a body part P1. Accordingly, the user U is induced to operate the objects 220 in the horizontal direction or the vertical direction by making an approximately arcuate movement, which is a natural movement, of the hand. As the objects 220 are arranged corresponding to an approximately arcuate movement of the hand of the user U in the virtual thee-dimensional space 210, the objects 220 can be actually operated in the horizontal direction or the vertical direction as intended by the user U through the approximately arcuate movement M performed by the user as induced.

Each object 220 can have a front face and side faces and can be arranged such that the front face towards the reference point 230. In the example shown in the drawing, a hatched portion corresponds to the front face of each object 220. By adjusting the direction that each object 220 faces in this manner, it is possible to, when the object 220 is an icon representing a pointer corresponding to a hand of the user U, for example, allow the icon to be perceived as tilting and thus to feed back the actual tilt of the hand to the user U. Thus, the user U can easily grasp a sense of depth of the virtual three-dimensional space 210.

(Setting of Reference Point in Accordance with Position of User)

Figure 4:
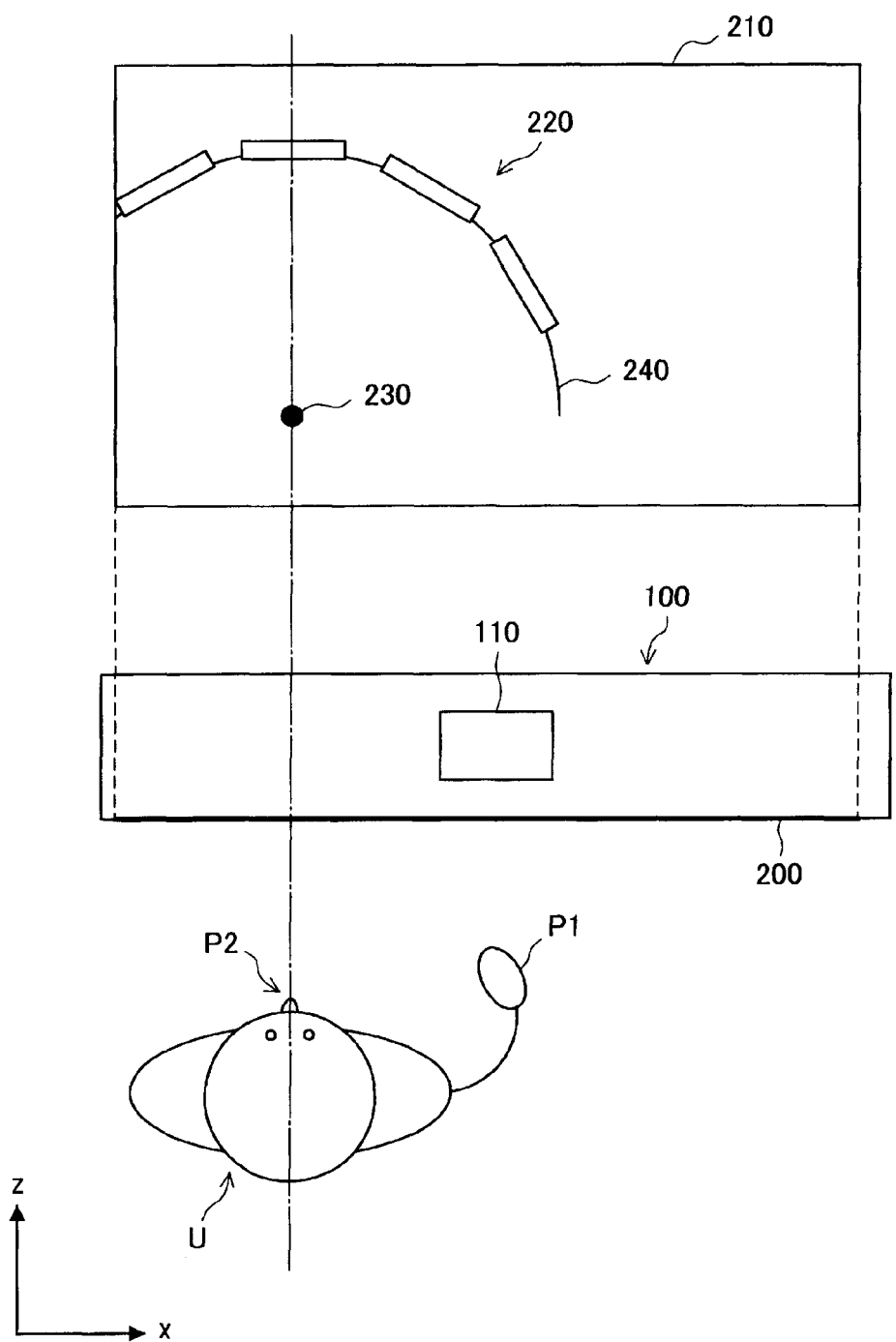
FIG. 4 is a diagram illustrating an example in which a reference point is set in accordance with the position of a user in the first embodiment.

FIG. 4 is a diagram illustrating an example in which the reference point 230 is set in accordance with the position of the user U in the first embodiment of the present disclosure. Referring to FIG. 4, the acquisition section 110 of the information processing device 100 acquires the position of the center part P2 of the body of the user U, and the reference point 230 is set based on the center part P2 of the body.

Herein, the acquisition section 110 acquires the position of the center part P2 of the body of the user U. Although a face is shown as the center part P2 of the body herein, the center part P2 of the body can be another body part of the user U such as a shoulder, knee, or waist. The display control section 120 sets the position of the reference point 230 based on the position of the center part P2 of the body acquired by the acquisition section 110. For example, the display control section 120 can set the reference point 230 in the virtual three-dimensional space 210 such that its horizontal position corresponds to the position of the center part P2 of the body as shown. The display control section 120 can also set the reference point 230 such that its vertical position in the virtual three-dimensional space 210 corresponds to the position of the center part P2 of the body.

As described above, the first curved plane 240 is set based on the reference point 230, and the objects 220 are arranged on the first curved plane 240. When the objects 220 are arranged in the virtual three-dimensional space 210 in this manner, the user U can recognize that the objects 220 are arranged in approximately arcuate lines in positions corresponding to the position of the user U even if the user U is positioned off the center of the display screen 200. Thus, it becomes easier for the user U to grasp the arrangement of the objects 220 in the virtual three-dimensional space 210 and the movement M of the body of the user U while linking them to each other. Accordingly, the user U can be induced to operate the objects 220 through a natural, approximately arcuate movement of the body part P1.

(Setting of Virtual Distance in Accordance with Position of User)

Figure 5A:
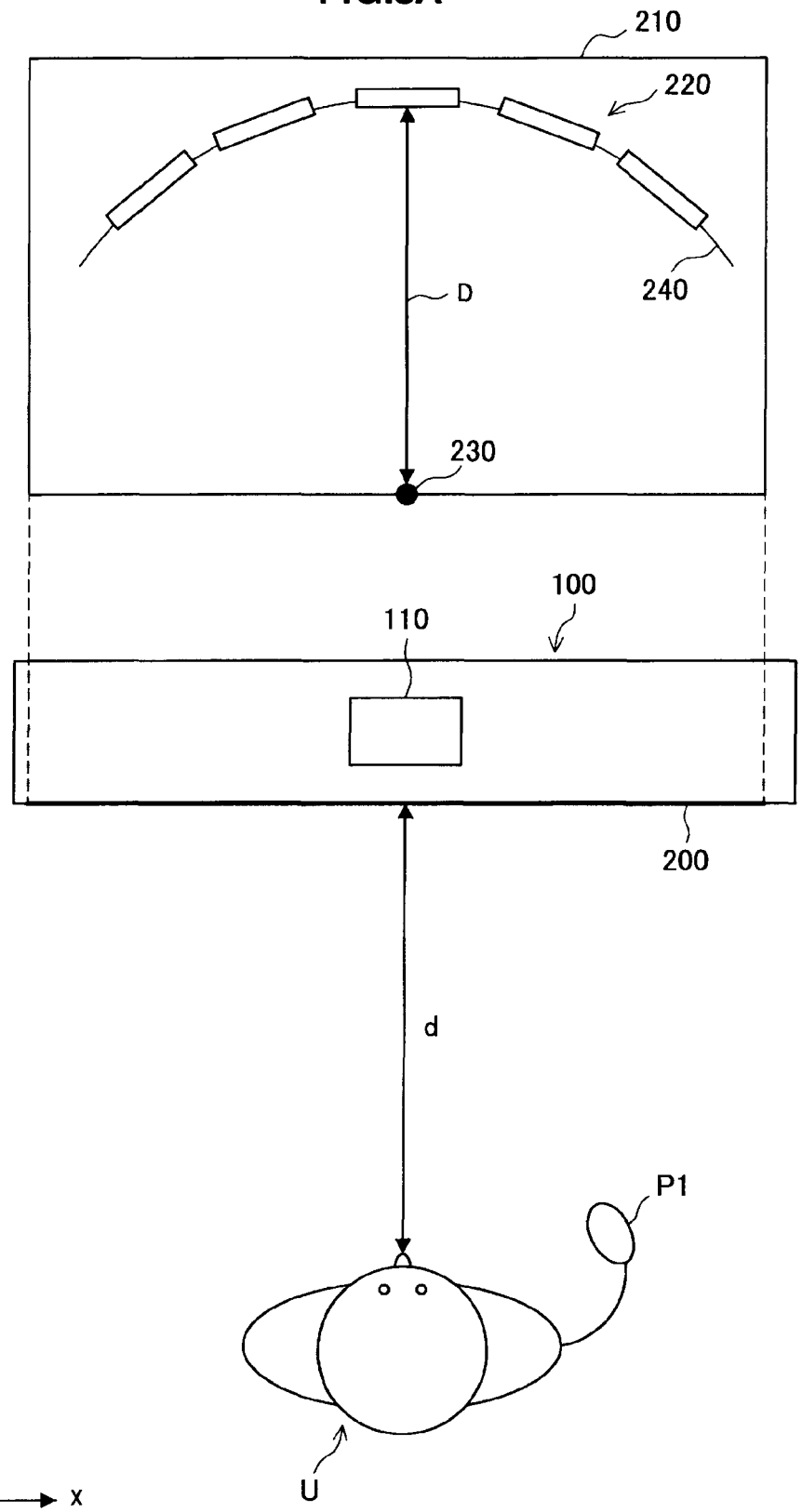
FIG. 5A is a diagram illustrating an example in which a virtual distance is set in accordance with the position of a user in the first embodiment.
Figure 5B:
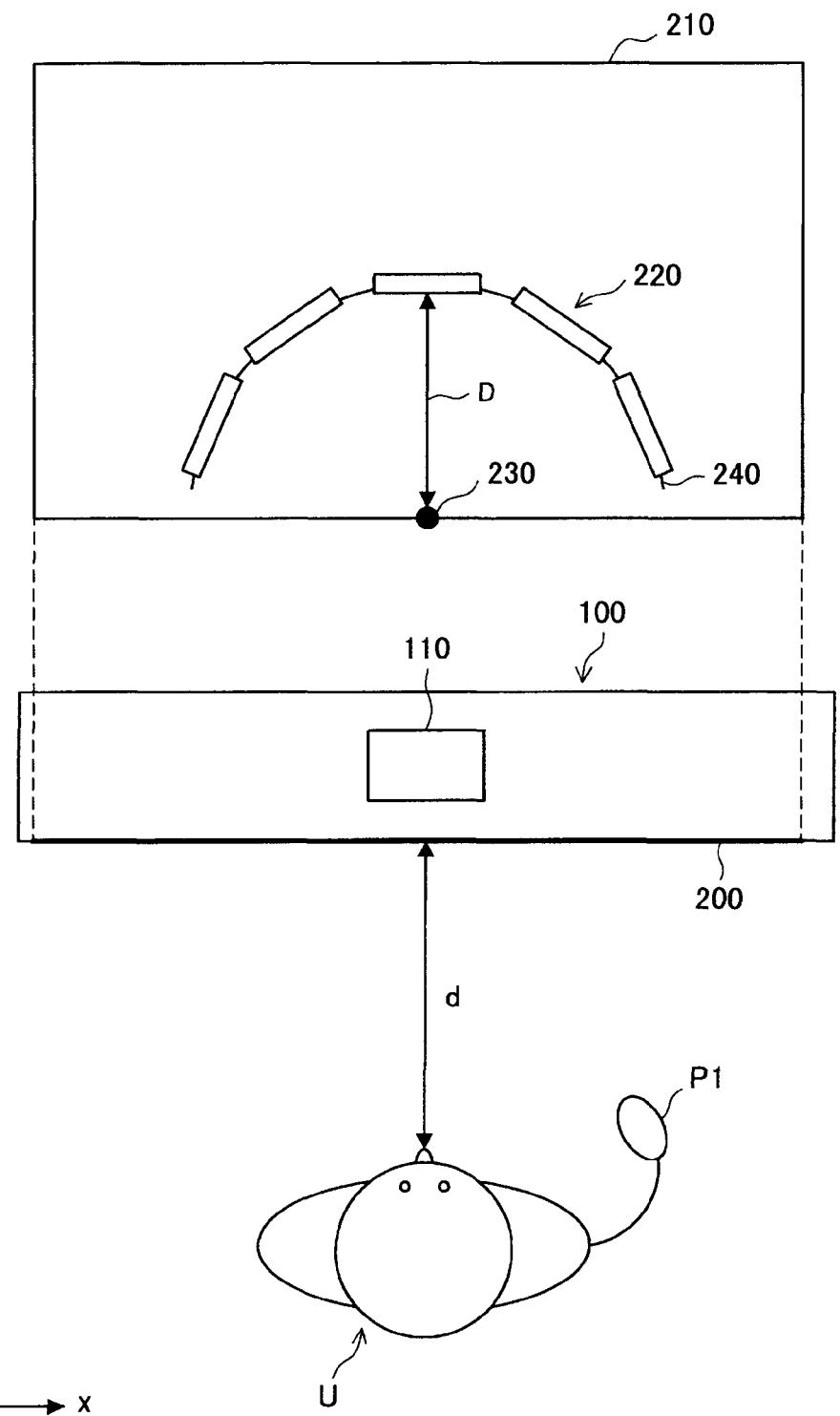
FIG. 5B is a diagram illustrating an example in which a virtual distance is set in accordance with the position of a user in the first embodiment.

FIGS. 5A and 5B are diagrams each illustrating an example in which the virtual distance D is set in accordance with the position of the user U in the first embodiment of the present disclosure. Referring to FIGS. 5A and 5B, the acquisition section 110 of the information processing device 100 acquires the actual distance d to the body of the user U. The virtual distance D from the reference point 230 to the object 220 is set based on the actual distance d.

Herein, the acquisition section 110 acquires the actual distance d to the body of the user U. Although the actual distance d herein is shown as the distance from the display screen 200 to the body of the user U, the actual distance d is not limited thereto and can be, for example, the distance from the acquisition section 110 to the body of the user U. The display control section 120 sets the virtual distance D from the reference point 230 to the object 220 arranged on the first curved plane 240 based on the actual distance d acquired by the acquisition section 110.

For example, FIG. 5A shows a case in which the actual distance d from the display screen 200 to the body of the user U is relatively long. In this case, the display control section 120 sets the virtual distance D from the reference point 230 to the object 220 arranged on the first curved plane 240 to a relatively large value. That is, the objects 220 are displayed such that they look far away in the virtual three-dimensional space 210.

Meanwhile, FIG. 5B shows a case in which the actual distance d from the display screen 200 to the body of the user U is shorter than that shown in FIG. 5A. In this case, the display control section 120 sets the virtual distance D from the reference point 230 to the object 220 arranged on the first curved plane 240 to a value smaller than that shown in FIG. 5A. That is, the objects 220 are displayed such that they look closer in the virtual three-dimensional space 210 than those shown in FIG. 5A.

Although the x-z plane is shown for simplicity herein, the virtual distance D can also include components in the y-axis direction in the virtual three-dimensional space 210 as shown in FIG. 3.

When the objects 220 are arranged with the virtual distance D set as described above, the user U recognizes, for example, that as he/she gets closer to the display screen 200, the objects 220 are displayed gradually closer to him/her as if the objects 220 are surrounding him/her. Thus, it becomes easier for the user U to easily grasp the arrangement of the objects 220 in the virtual thee-dimensional space 210 and the movement M of the body of the user U while linking them to each other. Accordingly, the user U can be induced to operate the objects 220 through a natural, approximately arcuate movement of the body part P1.

(Setting of Virtual Distance in Accordance with Size of User)

Figure 6A:
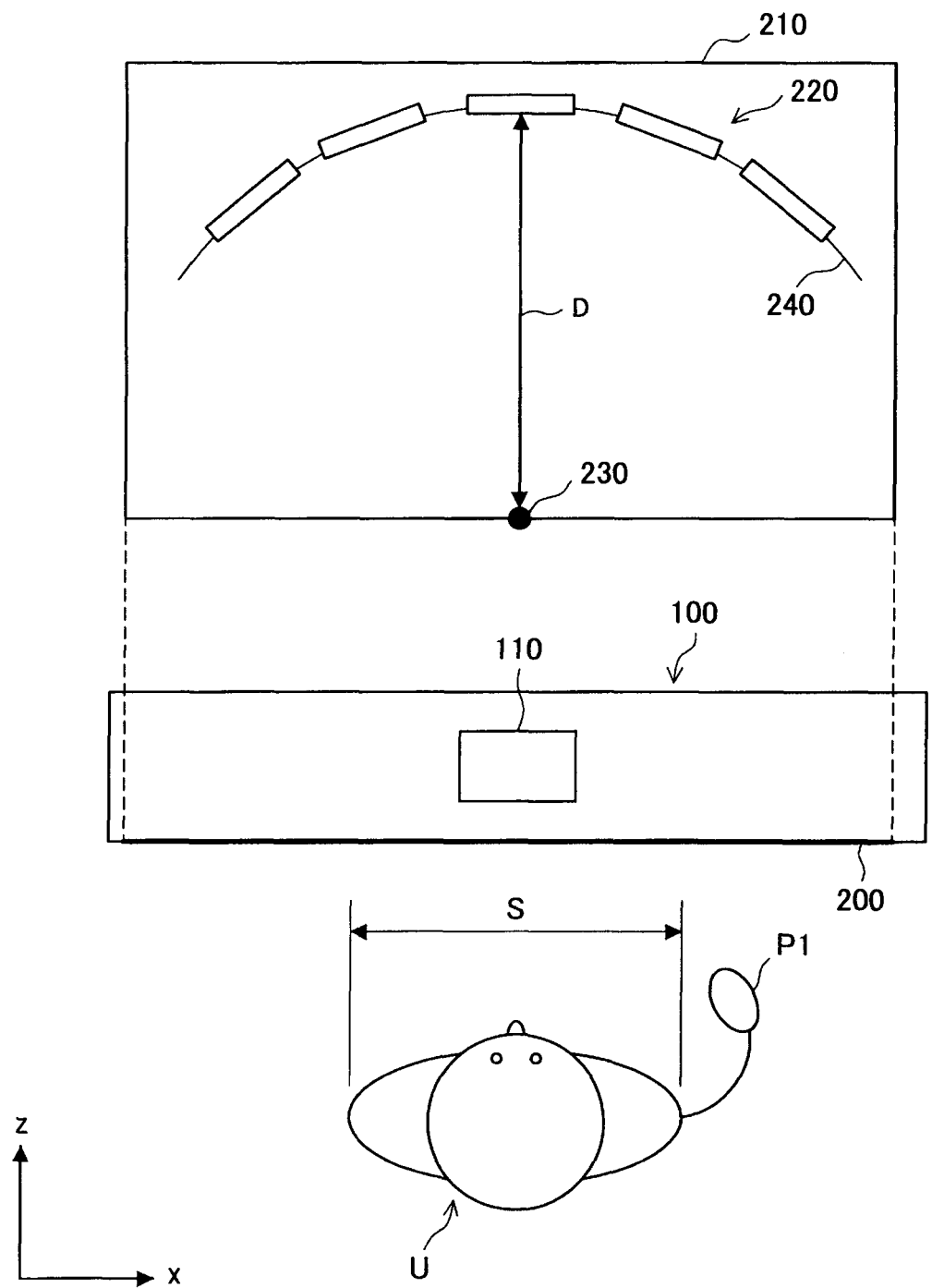
FIG. 6A is a diagram illustrating an example in which a virtual distance is set in accordance with the size of a user in the first embodiment.
Figure 6B:
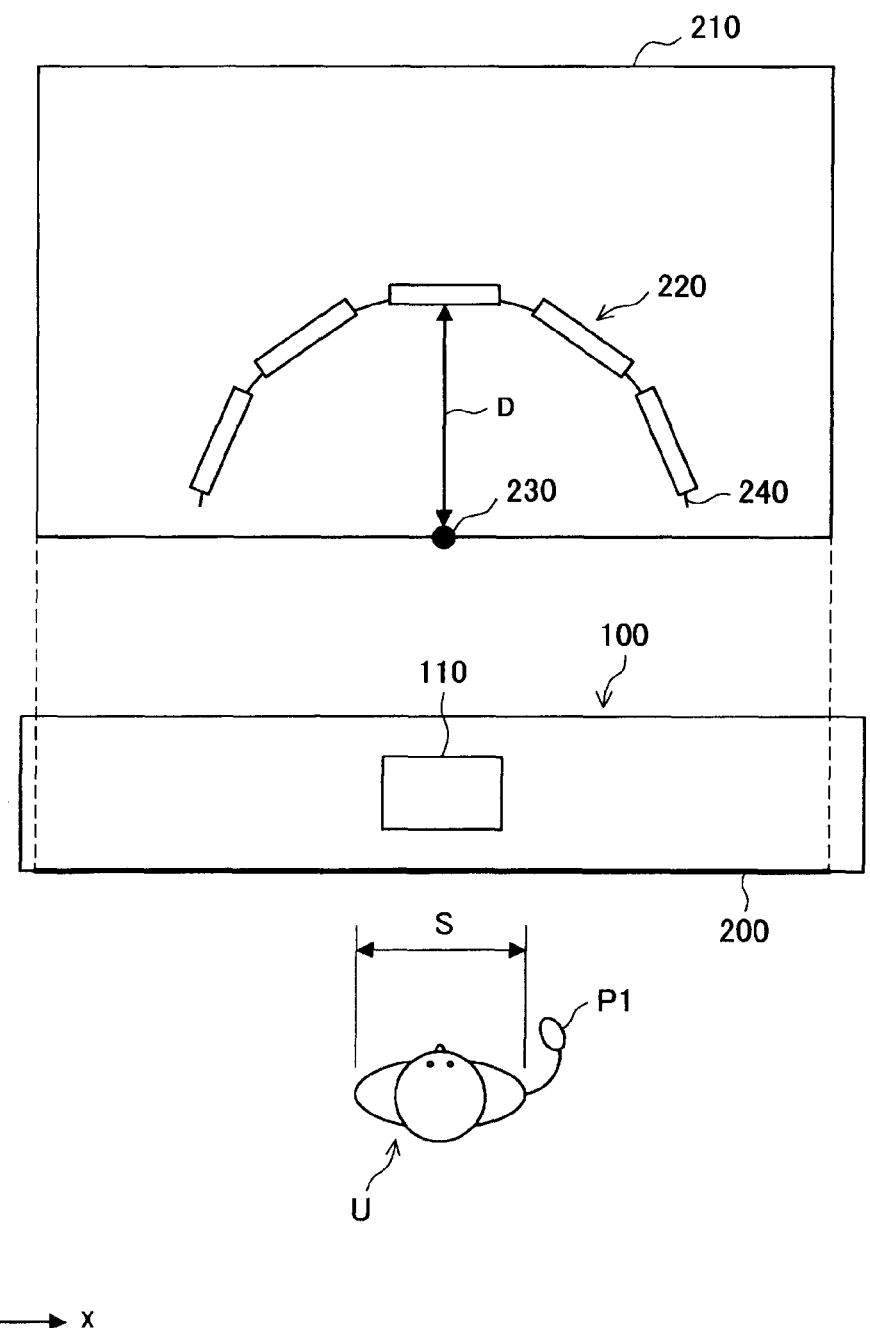
FIG. 6B is a diagram illustrating an example in which a virtual distance is set in accordance with the size of a user in the first embodiment.

FIGS. 6A and 6B are diagrams each illustrating an example in which the virtual distance D is set in accordance with the size of the user U in the first embodiment of the present disclosure. Referring to FIGS. 6A and 6B, the acquisition section 110 of the information processing device 100 acquires the body size S of the user U, and the virtual distance D from the reference point 230 to the object 220 is set based on the size S.

Herein, the acquisition section 110 acquires the body size S of the user U. The size S can be, for example, the length of the body of the user U in the horizontal direction as shown. The size S can be various sizes of the body of the user U such as the length of the body of the user U in the vertical direction, the size of a hand, or the length of an arm. The display control section 120 sets the virtual distance D from the reference point 230 to the object 220 arranged on the first curved plane 240 based on the size S acquired by the acquisition section 110.

For example, FIG. 6A shows a case in which the body size S of the user U is relatively large. In this case, the display control section 120 sets the virtual distance D from the reference point 230 to the object 220 arranged on the first curved plane 240 to a relatively large value. That is, the objects 220 are displayed such that they are arranged in an approximately arcuate line with a large radius in the virtual thee-dimensional space 210.

Meanwhile, FIG. 6B shows a case in which the body size S of the user U is smaller than that shown in FIG. 6A. In this case, the display control section 120 sets the virtual distance D from the reference point 230 to the object 220 arranged on the first curved plane 240 to a value smaller than that shown in FIG. 6A. That is, the objects 220 are displayed such that they are arranged in an approximately arcuate line with a smaller radius than that shown in FIG. 6A.

Although the x-z plane is shown for simplicity herein, the virtual distance D can also include components in the y-axis direction in the virtual three-dimensional space 210 as shown in FIG. 3.

When the objects 220 are arranged with the virtual distance D set as described above, the user U recognizes that the objects 220 are displayed close to the user U as if the objects 220 are surrounding him/her in a radius that corresponds to the body size S of the user U. Thus, it becomes easier for the user U to grasp the arrangement of the objects 220 in the virtual three-dimensional space 210 and the movement M of the body of the user U while linking them to each other. Accordingly, the user U can be induced to operate the objects 220 through a natural, approximately arcuate movement of the body part P1.

(2. Second Embodiment)

Next, the second embodiment of the present disclosure will be described with reference to FIG. 7. The second embodiment of the present disclosure differs from the first embodiment in the arrangement of the displayed objects. However, the other functions and configurations are approximately the same as those of the first embodiment. Thus, detailed description thereof is omitted herein.

Figure 7:
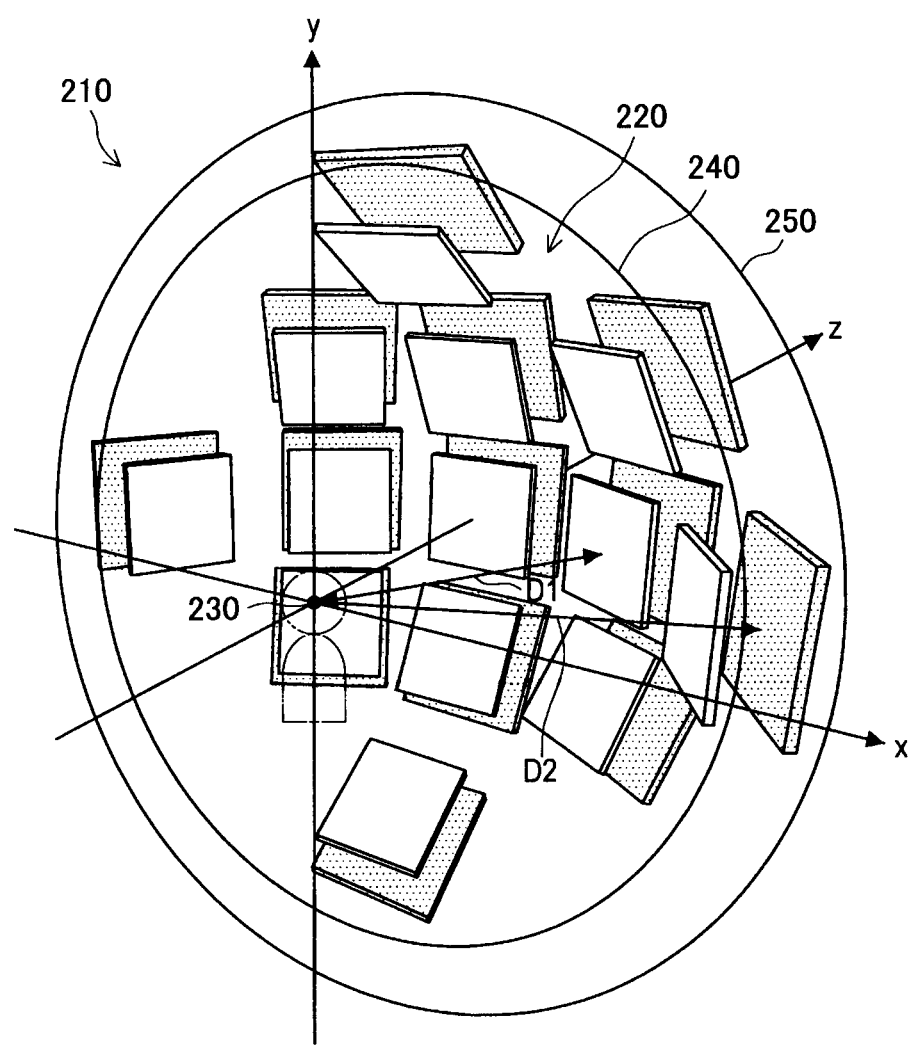
FIG. 7 is a diagram illustrating an arrangement of objects displayed in the second embodiment of the present disclosure.

FIG. 7 is a diagram illustrating an arrangement of the objects 220 displayed in the second embodiment of the present disclosure. Referring to FIG. 7, the objects 220 are also arranged on a second curved plane 250 corresponding to a curved movement of the user U, based on the reference point 230. A virtual distance D2 from the reference point 230 to the object 220 arranged on the second curved plane 250 is longer than the virtual distance D1 from the reference point 230 to the object 220 arranged on the first curved plane 240.

The second curved plane 250 can be an approximately spherical plane having the reference point 230 as the center as with the first curved plane 240. The display control section 120 of the information processing device 100 can display the objects 220 on the first curved plane 240 and the objects 220 on the second curved plane 250 in an overlapped manner in the virtual three-dimensional space 210. For example, the first curved plane 240 and the second curved plane 250 can be selectively used such that when the objects 220 are icons representing content, icons representing the frequently viewed content are displayed on the first curved plane 240 and icons representing the less frequently viewed content are displayed on the second curved plane 250.

When the objects 220 are arranged in an overlapped manner using the first curved plane 240 and the second curved plane 250 as described above, it becomes possible to display more objects 220 in the virtual three-dimensional space 210. Meanwhile, the user U can cause the objects 220 to be displayed farther from him/her by hand moving away from his/her body, and can cause the objects 220 to be displayed closer to him/her by hand moving closer to his/her body. Accordingly, the user U can perform an operation of, for example, interchanging the objects 220 on the first curved plane 240 and the objects 220 on the second curved plane 250 more intuitively.

Note that the setting of the reference point 230 in accordance with the position of the user U, the setting of the virtual distance D in accordance with the actual distance d to the body of the user U, and the setting of the virtual distance D in accordance with the size S of the user U that have been described in the first embodiment can be similarly applied in this embodiment. In this case, the display control section 120 increases or reduces the virtual distance D1 from the reference point 230 to the object 220 arranged on the first curved plane 240 and the virtual distance D2 from the reference point 230 to the object 220 arranged on the second curved plane 250. The virtual distances D1 and D2 can be increased or reduced with a predetermined ratio kept therebetween, for example, or increased or reduced independently of each other.

(3. Third Embodiment)

Next, the third embodiment of the present disclosure will be described with reference to FIG. 8. The third embodiment of the present disclosure differs from the first embodiment in the arrangement of the displayed objects. However, the other functions and configurations are approximately the same as those of the first embodiment. Thus, detailed description thereof is omitted herein.

Figure 8:
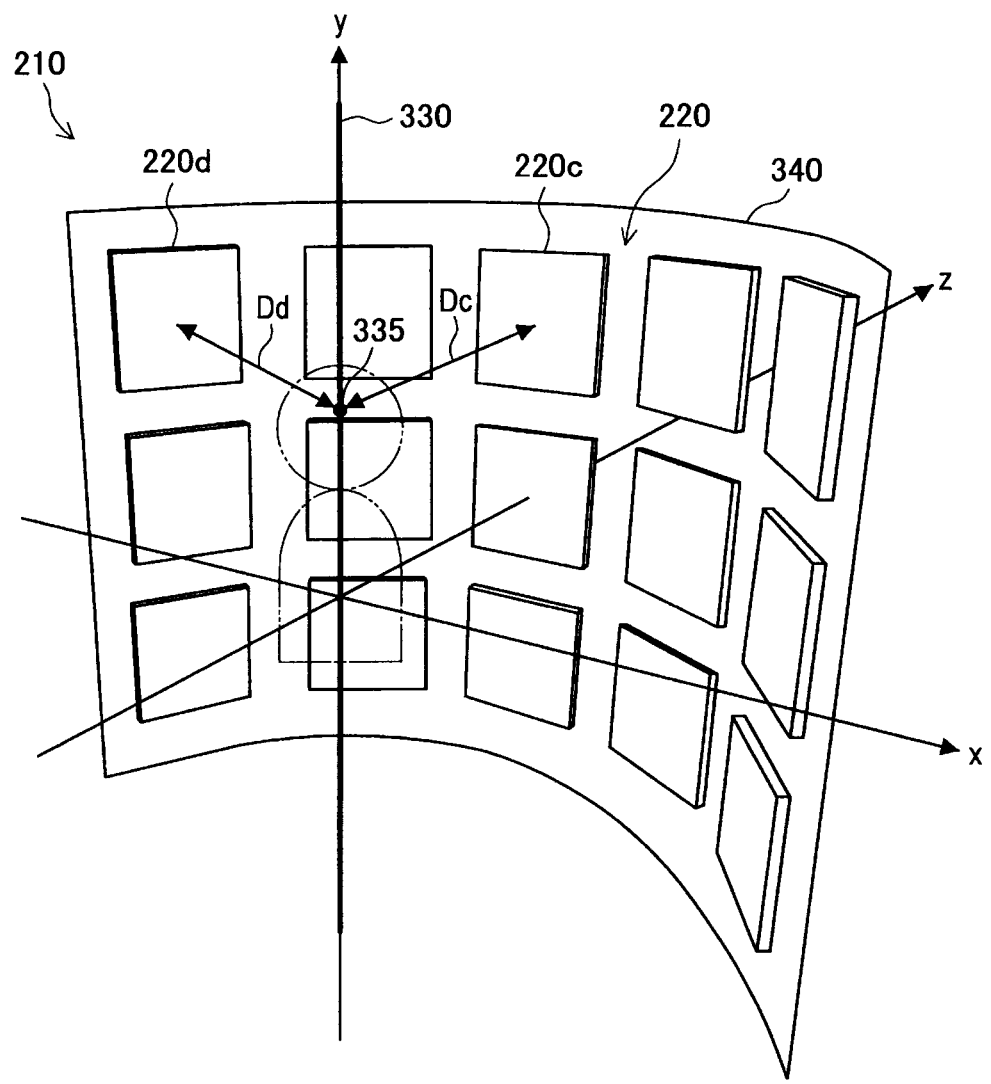
FIG. 8 is a diagram illustrating an arrangement of objects displayed in the third embodiment of the present disclosure.

FIG. 8 is a diagram illustrating an arrangement of the objects 220 displayed in the third embodiment of the present disclosure. Referring to FIG. 8, the objects 220 are arranged on a first curved plane 340 that is an approximately cylindrical plane having a reference line 330 set in the virtual three-dimensional space 210 as the center.

The reference line 330 is a straight line set as the virtual position of the user U in the virtual three-dimensional space 210. The reference line 330 can be set as, for example, a straight line corresponding to the virtual body axis of the user U. Note that the reference line 330 is not necessarily related to the actual viewpoint of the user U. As described above, the movement M of the body of the user U can be an approximately arcuate movement that is based on the body axis of the user U as the center. Thus, in the virtual three-dimensional space 210, the first curved plane 340 that is an approximately cylindrical plane having the reference line 330, which is set as the virtual position of the user U, as the center is a curved plane corresponding to the curved movement M of the user U based on the reference line 330.

The distance from a point on the reference line 330 to each of the plurality of objects 220, which are arranged in the same vertical position of the first curved plane 340, is approximately equal. For example, a distance Dc from a point 335 on the reference line 330 to an object 220c is approximately equal to a distance Dd from the point 335 on the reference line 330 to an object 220d that is positioned at the same vertical position as the object 220c. This means that the arrangement of the objects 220 in the horizontal direction seen from the user U is not a straight line in the horizontal direction but an approximately arcuate line with a point on the reference line 330 as the center.

Although the reference line 330 herein is shown as a straight line in the vertical direction of the virtual three-dimensional space 210, the reference line 330 is not limited thereto and can be any straight line set as the virtual position of the user U. For example, the reference line 330 can be a straight line in the horizontal direction of the virtual thee-dimensional space 210. In that case, the reference line 330 can be set as a line that connects the virtual right and left shoulders of the user U.

With the aforementioned arrangement of the objects 220, the user U recognizes from the display of the display screen 200 that, for example, the objects 220 are arranged corresponding to an approximately arcuate movement, which is a natural movement, of a hand that is a body part P1. Accordingly, the user U is induced to operate the objects 220 in the horizontal direction by making an approximately arcuate movement, which is a natural movement, of the hand. As the objects 220 are arranged corresponding to an approximately arcuate movement of the hand of the user U in the virtual thee-dimensional space 210, the objects 220 can be actually operated in the horizontal direction as intended by the user U through the approximately arcuate movement M performed by the user as induced. Meanwhile, the objects 220 are arranged in straight lines in the vertical direction. For example, when the objects 220 are frequently operated in the horizontal direction of the virtual three-dimensional space 210 with a function provided by the information processing device 100, arranging the objects 220 in straight lines in the vertical direction in which the objects 210 are not frequently operated will make it possible to display the virtual three-dimensional space 210 that provides a sense of stability to the user U.

Note that the setting of the reference point 230 in accordance with the position of the user U, the setting of the virtual distance D in accordance with the actual distance d to the body of the user U, and the setting of the virtual distance D in accordance with the size S of the user U that have been described in the first embodiment can be similarly applied in this embodiment. In this case, consider a plane that is perpendicular to the reference line 330 like the x-z plane of when the reference line 330 is a straight line in the y-axis direction. Then, it is possible to set the arrangement of the objects 220 by handling the reference line 330 in the same manner as the reference point 230 in the first embodiment.

In addition, in this embodiment, it is also possible to set a second curved plane in addition to the first curved plane 340 and also arrange the objects 220 on the second curved plane as in the second embodiment. In such a case, the second curved plane can be an approximately cylindrical plane having the reference line 330 as the center as with the first curved plane 340.

(4. Conclusion)

In the aforementioned embodiment of the present disclosure, the acquisition section 110 can acquire the position of the center part P2 of the body of the user U, and the reference point 230 or the reference line 330 can be set based on the position of the center part P2. According to such a configuration, the arrangement of the displayed objects 220 can be made to correspond to the position of the user U who is located opposite the display screen 200. Therefore, it is possible to make the user U grasp the arrangement of the objects 220 in the virtual three-dimensional space 210 and the movement M of the body of the user U while linking them to each other more effectively and to induce the user U to operate the objects 220 through a natural, curved movement of his/her body.

In the aforementioned embodiment of the present disclosure, the acquisition section 110 can acquire the actual distance d to the body of the user U, and the virtual distance D from the reference point 230 or the reference line 330 to the object 220 can be set based on the actual distance d. According to such a configuration, it is possible to vary the distance to the object 220 in the virtual three-dimensional space 210 according to whether the user U is located close to or far from the display screen 200. Therefore, it is possible to make the user U grasp the arrangement of the objects 220 in the virtual three-dimensional space 210 and the movement M of the body of the user U while linking them to each other more effectively and to induce the user U to operate the objects 220 through a natural, curved movement of his/her body.

In the aforementioned embodiment of the present disclosure, the acquisition section 110 can acquire the body size S of the user U, and the virtual distance D from the reference point 230 or the reference line 330 to the object 220 can be set based on the size S. According to such a configuration, it is possible to vary the distance to the object 220 in the virtual three-dimensional space 210 according to the body size S of the user. That is, for a user U with a relatively large body, the objects 220 can be displayed in a position relatively far from his/her in the virtual three-dimensional space 210, and for a user U with a relatively small body like a child, the objects 220 can be displayed in a position relatively close to his/her in the virtual three-dimensional space 210. For example, when the user U intends to move the objects 220 by moving his/her hand, the objects 220 can be arranged in a position corresponding to the length of the arm of the user U. Therefore, it is possible to make the user U grasp the arrangement of the objects 220 in the virtual three-dimensional space 210 and the movement M of the body of the user U while linking them to each other more effectively and to induce the user U to operate the objects 220 through a natural, curved movement of his/her body.

In the aforementioned embodiment of the present disclosure, the objects 220 can also be arranged on the second curved plane 250, which corresponds to the curved movement M, based on the reference point 230 or the reference line 330. In addition, the virtual distance D2 from the reference point 230 or the reference line 330 to the object 220 arranged on the second curved plane 250 can be longer than the virtual distance D1 from the reference point 230 or the reference line 330 to the object 220 arranged on the first curved plane 240.

According to such a configuration, it is possible to arrange more objects 220 in the virtual three-dimensional space 210. In addition, the user U can recognize the objects 220, which are arranged such that they overlap one another in a direction away from the body of the user U, in the virtual three-dimensional space 210, and can be induced to operate the objects 220 in the overlapping direction thereof by making a natural movement in a direction away from the body.

In the aforementioned embodiment of the present disclosure, each object 220 can have a front face and side faces, and arranged such that the front face towards the reference point 230 or the reference line 330. According to such a configuration, the user U can easily grasp a sense of depth of the virtual three-dimensional space 210.

In the aforementioned embodiment of the present disclosure, the virtual position of the user U can be set as the reference point 230 in the virtual three-dimensional space 210. According to such a configuration, it is possible to make the user U link the arrangement of the objects 220 to the movement M of the body of the user U in each of the horizontal direction and the vertical direction and to induce the user U to operate the objects 220 through a natural, curved movement of his/her body.

In the aforementioned embodiment of the present disclosure, the curved movement M can be an approximately arcuate movement, and the first curved plane 240 can be a spherical plane having the reference point 230 as the center. In addition, the second plane 250 can also be an approximately spherical plane like the first curved plane 240. According to such a configuration, it is possible to arrange the objects 220 on the first curved plane 240 or the second curved plane 250 that corresponds to an approximately arcuate movement, which is a natural body movement, of the user U in the vertical direction and the horizontal direction such as, for example, an approximately arcuate movement of a hand of the user U with his/her shoulder as the center.

In the aforementioned embodiment of the present disclosure, the virtual position of the user U can be set as the reference line 330 in the virtual three-dimensional space 210. According to such a configuration, it is possible to make the user U link the arrangement of the objects 220 to the movement M of the body of the user U in a specific direction such as the horizontal direction or the vertical direction and to induce the user U to operate the objects through a natural, curved movement of his/her body. Meanwhile, arranging the objects 220 in straight lines in the other directions will make it possible to display the virtual three-dimensional space 210 that provides a sense of stability to the user U.

According to the aforementioned embodiment of the present disclosure, the curved movement M can be an approximately arcuate movement, and the first curved plane 340 can be an approximately cylindrical plane having the reference line 330 as the center. In addition, the second curved plane can also be an approximately cylindrical plane like the first curved plane 340. According to such a configuration, it is possible to arrange the objects 220 on the first curved plane 340 or the second curved plane that corresponds to an approximately arcuate movement, which is a natural body movement, of the user U in a specific direction such as the vertical direction or the horizontal direction, like an approximately arcuate movement of a hand of the user U with his/her trunk as the center, for example.

Although the preferred embodiments of the present disclosure have been described in detail with reference to the appended drawings, the present disclosure is not limited thereto. It is obvious to those skilled in the art that various modifications or variations are possible insofar as they are within the technical scope of the appended claims or the equivalents thereof. It should be understood that such modifications or variations are also within the technical scope of the present disclosure.

For example, although the aforementioned embodiments have illustrated an example in which each of the first curved plane and the second curved plane is an approximately spherical plane or an approximately cylindrical plane, the present disclosure is not limited thereto. For example, each of the first curved plane and the second curved plane can be another quadric plane that is based on a reference point or a reference line such as an elliptical plane, an elliptic paraboloid, an elliptic cylindrical plane, a hyperbolic cylindrical plane, or a parabolic cylindrical plane.

In addition, although the aforementioned embodiments have illustrated an example in which directions that are perpendicular to the depth direction are the horizontal direction and the vertical direction, the present disclosure is not limited thereto. For example, instead of using the horizontal direction and the vertical direction, it is also possible to use a diagonal direction that extends from the lower left to the upper right and a diagonal direction that extends from the upper left to the lower right. Such directions need not necessarily be orthogonal with respect to each other, and can be set as appropriate in accordance with a function provided by the information processing device, for example.

Further, although the aforementioned embodiments have illustrated the first curved plane and the second curved plane, the present disclosure is not limited thereto. For example, it is also possible to set a third curved plane for the second curved plane like the second curved plane set for the first curved plane. That is, the number of the curved planes on which the objects are arranged in the virtual three-dimensional space is not limited to two and can be any number.

The present disclosure contains subject matter related to that disclosed in Japanese Priority Patent Application JP 2010-184007 filed in the Japan Patent Office on Aug. 19, 2010, the entire content of which is hereby incorporated by reference.

What is claimed is:

1. An information processing device comprising:
a display control section configured to display a plurality of objects in a virtual three-dimensional space; and
a process execution section configured to execute a process on at least one selected object from among the plurality of objects based on a movement of a body of a user,
wherein the plurality of objects are arranged on an inside surface of a first curved plane in front of the user and a virtual position of the user from a perspective of the user in the virtual three-dimensional space, and each one of the plurality of objects is arranged to have a respective tilt such that the plurality of objects are all individually orientated for display towards a reference point on the virtual position of the user, the reference point is associated with a position of a part of the body of the user,
wherein the virtual position of the user is further set such that the user perceives virtual locations of the plurality of objects as being located in respective directions which are substantially aligned in orientation with the displayed plurality of objects taken from the perspective of the virtual position,
wherein the plurality of objects are arranged such that a normal line for a front face of each one of the plurality of objects is intersecting with the reference point, and
wherein the display control section and the process execution section are each implemented via at least one processor.

2. The information processing device according to claim 1, further comprising an acquisition section configured to acquire a position of a center part of the body of the user, wherein the virtual position of the user is set based on the position of the center part, and wherein the acquisition section is implemented via at least one processor.

3. The information processing device according to claim 1, further comprising an acquisition section configured to acquire an actual distance to the body of the user, wherein a virtual distance from the virtual position of the user to the plurality of objects is set based on the actual distance, and wherein the acquisition section is implemented via at least one processor.

4. The information processing device according to claim 1, further comprising an acquisition section configured to acquire a size of the body of the user, wherein a virtual distance from the virtual position of the user to the plurality of objects is set based on the size, and wherein the acquisition section is implemented via at least one processor.

5. The information processing device according to claim 1, wherein a plurality of objects are also arranged on an inside surface of a second curved plane from a perspective of the user based on the virtual position of the user, the second curved plane corresponding to the movement, and a virtual distance from the virtual position of the user to the plurality of objects arranged on the second curved plane is longer than a virtual distance from the virtual position of the user to the plurality of objects arranged on the first curved plane.

6. The information processing device according to claim 1, wherein each one of the plurality of objects has a front face and side faces, and the plurality of objects are arranged such that the front face is orientated towards the virtual position of the user.

7. The information processing device according to claim 1, wherein the virtual position of the user is a point in the virtual three-dimensional space.

8. The information processing device according to claim 7, wherein the movement is an approximately arcuate movement, and the first curved plane is an approximately spherical plane having the point as a center.

9. The information processing device according to claim 1, wherein the virtual position of the user is a straight line in the virtual three-dimensional space.

10. The information processing device according to claim 9, wherein the movement is an approximately arcuate movement, and the first curved plane is an approximately cylindrical plane having the straight line as a center.

11. The information processing device according to claim 1, wherein the virtual position of the user is set such that, from the perspective of the user, the plurality of objects are displayed to visually surround the user to be within the first curved plane.

12. An information processing method comprising:
displaying a plurality of objects in a virtual three-dimensional space; and
executing a process on at least one selected object from among the plurality of objects based on a movement of a body of a user,
wherein the plurality of objects are arranged on an inside surface of a first curved plane in front of the user and a virtual position of the user from a perspective of the user in the virtual three-dimensional space, and each one of the plurality of objects is arranged to have a respective tilt such that the plurality of objects are all individually orientated for display towards a reference point on the virtual position of the user, the reference point is associated with a position of a part of the body of the user,
wherein the virtual position of the user is further set such that the user perceives virtual locations of the plurality of objects as being located in respective directions which are substantially aligned in orientation with the displayed plurality of objects taken from the perspective of the virtual position, and
wherein the plurality of objects are arranged such that a normal line for a front face of each one of the plurality of objects is intersecting with the reference point.

13. The information processing method according to claim 12, wherein the virtual position of the user is set such that, from the perspective of the user, the plurality of objects are displayed to visually surround the user to be within the first curved plane.

14. A non-transitory computer-readable storage medium having stored therein a program, which when execute by a computer causes the computer to execute a method, the method comprising:
displaying a plurality of objects in a virtual three-dimensional space; and
executing a process on at least one selected object from among the plurality of objects based on a movement of a body of a user,
wherein the plurality of objects are arranged on an inside surface of a first curved plane in front of the user and a virtual position of the user from a perspective of the user in the virtual three-dimensional space, and each one of the plurality of objects is arranged to have a respective tilt such that the plurality of objects are all individually orientated for display towards a reference point on the virtual position of the user, the reference point is associated with a position of a part of the body of the user,
wherein the virtual position of the user is further set such that the user perceives virtual locations of the plurality of objects as being located in respective directions which are substantially aligned in orientation with the displayed plurality of objects taken from the perspective of the virtual position, and
wherein the plurality of objects are arranged such that a normal line for a front face of each one of the plurality of objects is intersecting with the reference point.

15. The non-transitory computer-readable storage medium according to claim 14, wherein the virtual position of the user is set such that, from the perspective of the user, the plurality of objects are displayed to visually surround the user to be within the first curved plane.

* * * * *